UNITED STATES PATENT OFFICE.

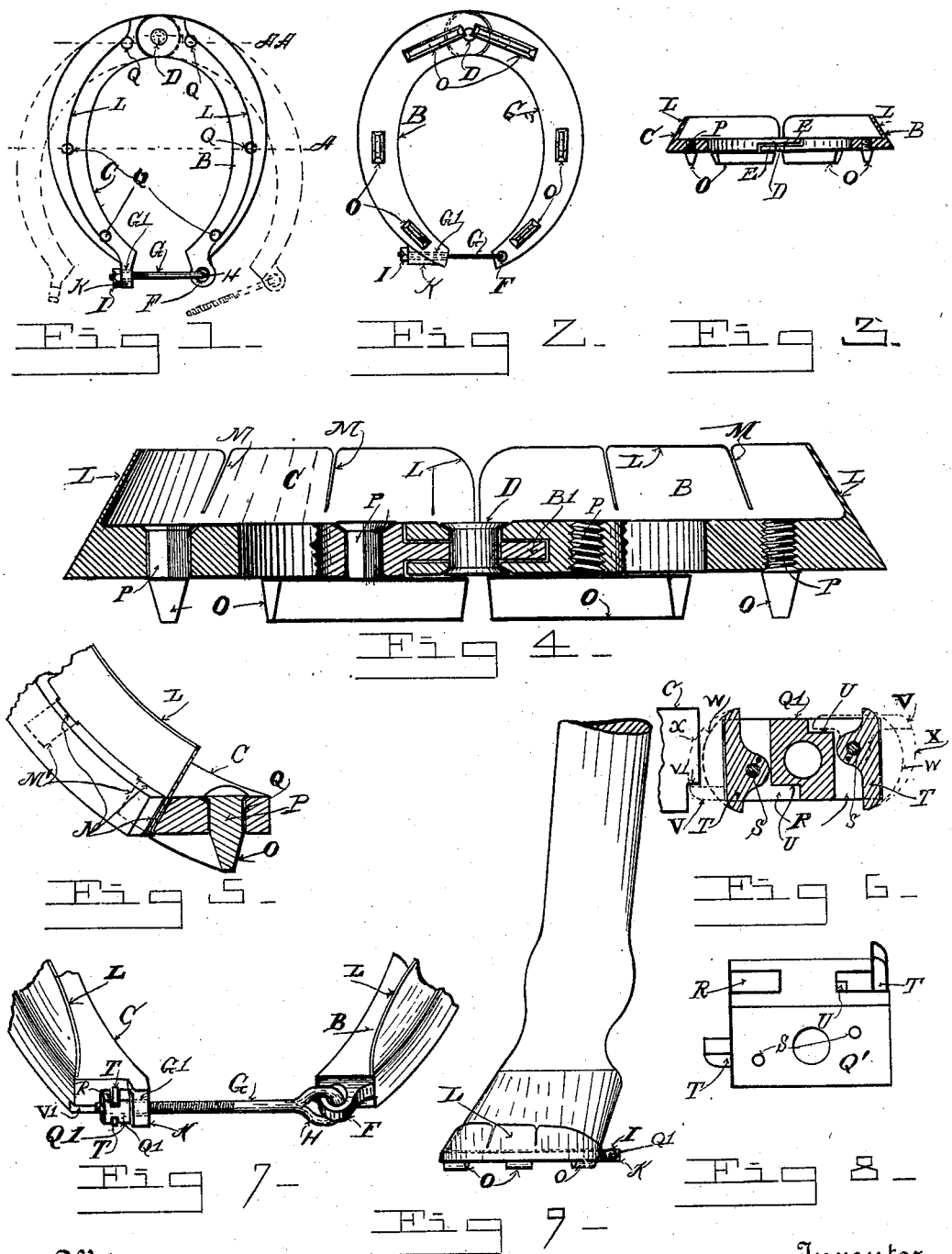

JOHN J. A. MILLER, OF DENVER, COLORADO.

NAILLESS CLAMPING HORSESHOE.

SPECIFICATION forming part of Letters Patent No. 595,401, dated December 14, 1897.

Application filed June 14, 1897. Serial No. 640,751. (No model.)

*To all whom it may concern:*

Be it known that I, JOHN J. A. MILLER, a citizen of the United States of America, residing at Denver, in the county of Arapahoe and State of Colorado, have invented certain new and useful Improvements in Nailless Adjustable Clamping Horseshoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in horseshoes; and the objects of my invention are, first, to provide a nailless adjustable clamping horseshoe; second, to provide a horseshoe having removable toe and side and heel calks; third, to provide a removable adjustable clamping horseshoe consisting of two independent similar-shaped side pieces pivotally connected together at their forward ends and having a clamping and fastening mechanism at the heel of the shoe adapted to clamp the shoe to a horse's hoof. I attain these objects by the mechanism illustrated in the accompanying drawings, in which—

Figure 1 represents a top plan view of my improved horseshoe; Fig. 2, a bottom plan view of the same; Fig. 3, a sectional view of Fig. 1 on line A; Fig. 4, an approximately full-size cross-section on lines A and A A of Fig. 1, the toe and side calks being shown in side elevation; Fig. 5, a fragmentary view of one side of the horseshoe, showing the adjustable clamping-band arranged to be made independent of the tread portion of the shoe and secured to it; Fig. 6, a sectional view of a lock-nut and a fragment of one end of the shoe; Fig. 7, a fragment of a shoe, showing the clamping-bolt and the lock-nut; Fig. 8, a perspective view of the lock-nut; and Fig. 9, a side elevation of a fragment of a horse's leg, showing my improved horseshoe applied to the hoof thereof.

Similar letters of reference refer to similar parts throughout the several views.

Referring to Fig. 1, B and C designate the two opposite sides of the tread portion of the horseshoe. These pieces are made independent of one another and at their forward ends are pivotally jointed together by a rivet D. This joint may be made by forming a reduced step portion E in each end of each part of the horseshoe and arranging them to overlap one another, as shown in Fig. 3, or by bifurcating the end of one half or half B and forming a tongue B' on the opposite half adapted to fit pivotally the recess of the bifurcated end, as shown in Fig. 4. At the opposite end of the half B, I form an eye F, in which I secure a bolt G, which has an eye H formed in one end. This eye H is freely linked to the eye F of the half B. The opposite end of the bolt is threaded, and a nut I is threaded to it. The nut I may be a common form of nut, but I preferably use a lock-nut, as shown in Fig. 7. The free end of the bolt G passes freely through an aperture G', formed in a projecting lug K, which forms an integral part of the end of the opposite half C of the horseshoe. Around each half of the horseshoe I form a band L, which I term a "clamping-band." These bands are arranged to extend far enough above the top of each side of the shoe to embrace a portion of the sides of a horse's hoof, and they are inclined to stand at an acute angle to the top surface of each side in order that they may stand approximately at the same angle relative to the tread of the shoe that the sides of the horse's hoof are to the bottom or tread of the hoof. I make these bands quite thin in order that they may be easily bent either in or out, and I preferably divide them by vertical slits M, which extend through the greater part of the height into three or more sections, as shown in Fig. 4, which allows them to be readily bent either in or out and thus to be fitted exactly to the angle and shape of a horse's hoof. I make the band higher at the front of the shoe than at the back and preferably round it off at both ends and slope its top edge from the front end to the back end enough to give it a neat and light appearance. I preferably form these bands integral with the tread portion of the shoe, as shown in Figs. 1, 3, and 4, as I am able to stamp or press each half of the shoe all complete from either iron or steel or aluminium, or they can be molded of paper or wood pulp or any other suitable material.

In Fig. 5 I illustrate a fragment of one side of the shoe, showing a modification of the tread and band. The band as here illustrated comprises an independent member and is secured to the tread portion of the shoe. There are many ways of securing the bands to the treads, but I preferably carry out this feature of my invention in the following manner: I form the clamping-bands of a thin strip of metal and curve them to match the curve of the sides. The body of the lower edge of the strip is adapted to rest on the top of the shoe, and from the lower edge two or three projections M' depend, which are formed by cutting recesses in the edges of the bands. These depending projections extend into and through slots N, formed in the tread-pieces of each half of the shoe, which are arranged to register with and receive the projections, which are riveted in them.

O designates calks. They are placed at the toe, heel, and sides and are made independent of the shoe and are provided with a central projection P. I preferably arrange them to be detachably secured to the shoe, and for this purpose I preferably make the projection either round or square. I cut a thread on those which are provided with the round projections and screw them into holes Q at the front, side, and rear of each of the sides. These holes are threaded to receive the projections, as shown in Figs. 1, 2, and 3 and in the side B of Fig. 4. When square shanks are used, I adapt them to fit freely in square holes which are countersunk at the top surface of the sides, and the top ends of the projections are upset, the square shank being arranged on the calks and the square holes in the sides of the shoe being arranged to allow the calks to stand at the proper angle under each side.

In Figs. 6, 7, and 8 I illustrate a lock-nut especially adapted for use on the end of the clamping-bolt G. It is to be distinctly understood, however, that I do not wish to be restricted to the use of this particular form of lock-nut, as there are many lock-nuts in use which could be used on the bolt. The nut illustrated, however, is adapted to lock against the lower edge of the heel of one side of the shoe. It comprises a rectangular-shaped nut Q', and in its two short sides I cut recesses R. In these recesses I pivot, by a pin S, a latch T, which is pivoted between its ends, but nearer to one end than to the opposite end. Both ends are arranged in line with one another, and each latch is pivoted oppositely from the other and to one side of the longitudinal center of the nut, and the latches are positioned in the recesses with their short ends adjacent to the nearest end of its longest sides. These latches are free to swing outwardly on their pivots, and in doing so their short ends move against a step U, formed in the recess, while their longest end swings around until it rests approximately parallel with the long side of the nut, as shown at V. In Figs. 6 and 7 I show a step-recess V' in the lower edge of the half C of the shoe. This step can, however, be dispensed with, but as it is easily formed when the side C is made, and as it makes a good bearing for the latches, I preferably use it when using this form of lock-nut, but should a nut be used which locks to the thread of the bolt this step may be left out of the side C.

The shoe is secured to a horse's hoof in the following manner: The hoof is first properly cleaned and trimmed up with a knife. The nut is then removed from the end of the clamping-bolt, and the tread-pieces are spread apart on their connecting-pivot until the clamping-bands will clasp over the hoof. The tread-pieces are then closed around the hoof, and the clamping-bands bear upon the front and sides of it, and should they not lie up against the hoof evenly and smoothly they should be made to do so by bending each section until it fits the angle and contour of the hoof. The clamping-bands should bear harder upon the hoof at their upper edges, and the edge of the hoof should have a small clear space all around at the apex of the angle of the band and the top of the treads. The nut is then applied to the clamping-bolt, which should be placed in its proper place through the projection of the opposite tread-piece when the shoe has been finally fitted to the hoof. The nut is then turned to tighten the shoe very firmly but not too tightly to the hoof. The nut is left in a position in which the latch nearest the heel of the tread of the tread-piece will swing out from its normal position by the heel of the tread-piece, the dotted lines W in Fig. 6 designating the path they move in when in their normal position and are turned with the nut, and the dotted lines X designate the path they move in when swung out independent of the nut in operative position. After the latch has been swung down into operative position the nut is turned backward until the latch bears on the step-recess in the edge of the tread-piece C, as shown in Figs. 6 and 9. This backward movement of the nut would not be enough to loosen in a perceptible degree the shoe on the hoof.

My improved horseshoe is very simple. It can be used either with or without calks, and when they are used they are removably secured and are thus easily replaced by new ones when worn without any damage to the tread-pieces. This character of horseshoe will be of a special value to farmers who do not have a horseshoeing-shop in their immediate vicinity. The shoes can be removed quickly and would be removed often by some owners of horses, especially by the owners of racing-horses. They will also allow a horse's hoof to grow more naturally than the present system of shoeing permits.

Having described my invention, what I claim as new, and desire to secure by Letters Patent, is—

1. In a horseshoe the combination of two independent tread-pieces pivotally secured together at their toe ends by a rivet inserted in a rivet-hole countersunk on both sides of the shoe, each tread having an integral clamping-band arranged to stand at an acute angle to the top surface of the tread and registering substantially with the angle of the surface of the horse's hoof, two vertical slits in said band at predetermined points extending from the top edge to near its union with the treads; a bolt having an eye at one end, a ring formed in the heel of one of the tread-pieces and coupled to the eye of said bolt, a projecting lip on the heel of the opposite tread-piece, a hole through said projecting lip adapted to freely receive the end of said bolt and a suitable thread and nut on the free end of said bolt, substantially as described.

2. The combination in a horseshoe, of two independent tread-pieces each forming one-half of the horseshoe, a suitable pivotal joint formed partially in each at their toe ends, and pivotally connected together to swing apart or together, an integral yielding clamping-band arranged to stand vertically at the outer edges of said tread-pieces and at an angle registering approximately with the angle of the horse's hoof, two or more vertical slits in each of said clamping-bands, an eye in the heel of one of said tread-pieces, a projecting lug containing an aperture on the heel of the opposite tread-piece, a bolt pivotally linked to said eyepiece and passing through said lug, and a suitable lock-nut on the end of said bolt, substantially as described.

In testimony whereof I affix my signature in presence of two witnesses.

JOHN J. A. MILLER.

Witnesses:
JAMES W. HANNA,
JOHN VIDEEN.